US009020345B2

(12) United States Patent
Fu et al.

(10) Patent No.: US 9,020,345 B2
(45) Date of Patent: Apr. 28, 2015

(54) METHOD AND SYSTEM FOR ESTABLISHING END-TO-END SERVICE AND OPTICAL TRANSPORT NETWORK

(75) Inventors: Xihua Fu, Shenzhen (CN); Xinling Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 247 days.

(21) Appl. No.: 13/637,043

(22) PCT Filed: Sep. 17, 2010

(86) PCT No.: PCT/CN2010/077025
§ 371 (c)(1),
(2), (4) Date: Oct. 24, 2012

(87) PCT Pub. No.: WO2011/116595
PCT Pub. Date: Sep. 29, 2011

(65) Prior Publication Data
US 2013/0028602 A1  Jan. 31, 2013

(30) Foreign Application Priority Data
Mar. 25, 2010 (CN) .......................... 2010 1 0143237

(51) Int. Cl.
H04J 14/00 (2006.01)
H04L 12/721 (2013.01)
(Continued)

(52) U.S. Cl.
CPC ............ *H04L 45/62* (2013.01); *H04L 12/5689* (2013.01); *H04Q 11/0066* (2013.01); *H04J 2203/0023* (2013.01); *H04J 3/085* (2013.01); *H04J 2203/0053* (2013.01);
(Continued)

(58) Field of Classification Search
None
See application file for complete search history.

(56) References Cited

U.S. PATENT DOCUMENTS 7,734,177 B2 *  6/2010  Jiang ............................... 398/58
7,764,630 B2 *  7/2010  Bunse ........................... 370/255
(Continued)

FOREIGN PATENT DOCUMENTS

CN  100450093     *  1/2009  ............. H04L 12/56
CN  100450093 C      1/2009

OTHER PUBLICATIONS

International Search Report dated Dec. 30. 2010 of PCT/CN2010/077025.
(Continued)

*Primary Examiner* — Li Liu
(74) *Attorney, Agent, or Firm* — Banner & Witcoff, Ltd.

(57) ABSTRACT

A method for establishing an end-to-end service is provided in the present invention, which includes: acquiring link information in a network and multi-stage multiplexing capability constraint information supported by gateway network elements; when an end-to-end path computation request is received, according to the link information and the multi-stage multiplexing capability constraint information, performing an end-to-end routing computation to acquire an end-to-end routing, and selecting a multi-stage multiplexing capability used on a gateway network element passed by the end-to-end routing; and configuring the end-to-end service, and configuring the selected multi-stage multiplexing capability on the gateway network element passed by the end-to-end routing. A system for establishing the end-to-end service, an optical transport network and a signal transmission method thereof are also provided in the present invention, which can all implement the interconnection between new networks and old networks.

10 Claims, 8 Drawing Sheets

(51) Int. Cl.
*H04L 12/54* (2013.01)
*H04Q 11/00* (2006.01)
*H04L 12/751* (2013.01)
*H04J 3/08* (2006.01)
*H04J 3/16* (2006.01)

(52) U.S. Cl.
CPC ........... H04L 45/10 (2013.01); H04Q 11/0062 (2013.01); *H04Q 2011/0073* (2013.01); *H04Q 2011/0088* (2013.01); *H04J 3/1652* (2013.01)

(56) References Cited

U.S. PATENT DOCUMENTS

| | | | | |
|---|---|---|---|---|
| 7,787,448 | B2* | 8/2010 | Zhang | 370/389 |
| 7,889,989 | B2* | 2/2011 | Zhang | 398/25 |
| 2007/0242608 | A1* | 10/2007 | Ou et al. | 370/238 |
| 2007/0269218 | A1* | 11/2007 | Zhang | 398/140 |
| 2010/0061301 | A1* | 3/2010 | Antal et al. | 370/328 |
| 2011/0116793 | A1* | 5/2011 | Zhang et al. | 398/43 |

OTHER PUBLICATIONS

Lui Yu-Jie, Xiao Jun, Ding Chi-wu, Xiang Jun-ling, Huang Xi, Progress and key Technologies of OTN Optical Communication Technology 2009, vol. 6, pp. 1-3.

International Telecommunication Union, ITU-T Study Group 13, ITU-T G872, Nov. 29, 2001, Summary, Sections 4,6,8.

International Search Report for PCT/CN2010/077025 dated Dec. 30, 2010.

ITU-T, G.709/Y.1331, Amendment 3, Apr. 2009, Series G: Transmission Systems and Media, Digital Systems and Networks, Digital terminal euipments—General, Series Y: Global Information Infrastructure, Internet Protocol Aspects and Next Generation Networks.

* cited by examiner

METHOD AND SYSTEM FOR ESTABLISHING END-TO-END SERVICE AND OPTICAL TRANSPORT NETWORK

TECHNICAL FIELD

The present invention belongs to the field of optical network transmission, and particularly, to a method and system for establishing an end-to-end service, an optical transport network and a signal transmission method thereof in an automatic switching optical network of optical transport network.

BACKGROUND OF THE RELATED ART

The Optical Transport Network (OTN) is a technique of digital wrapper disclosed in 1999 to solve the problem of high capacity transmission for high speed Time Division Multiplexing (TDM) signals. The OTN defined in the version of 2003 can provide functions such as transmission, multiplexing, protection and monitoring management and so on for client layer signals, and the supported client layer signals are mainly Ethernet signals supported by the Synchronous Transmission Module Level N (STM-N) and Asynchronous Transfer Mode (ATM) and supported through the Generic Framing Procedure (GFP), and the defined rate levels are 2.5G, 10G and 40G. With the Internet Protocol (IP) normalization for the transport network bearing signals and the popularization of a 10G Local Area Network (LAN) interface, the bearing of 10 Gigabit Ethernet (10GE) on the OTN becomes an important problem. Therefore, the International Telecommunication Union Telecommunication Standardization Sector (ITU-T) developed the G.sup43 standard in 2007, which defined the way of the OTN transmitting 10GE signals.

A multiplexing system of a traditional OTN is extremely simple. And the rate levels are 2.5G, 10G and 40G, which correspond to an Optical channel Data Unit (ODU)1, ODU2, ODU3 respectively. Services of Constant Bit Rate (CBR) are mapped to corresponding ODUks in the way of Asynchronous Mapping Procedure (AMP) or Bit-synchronous Mapping Procedure (BMP), and Packet services are mapped to the ODUks in the way of GFP, and then these ODUks are mapped to corresponding Optical channel Transmission Unit (OTU) ks. Certainly, the ODUs with low rate level also can be multiplexed to the ODUs with high rate level as shown in FIG. 1.

In order to adapt for multiple services, a new concept of High Order (HO) ODU and Low Order (LO) ODU is introduced in the OTN, as shown in FIG. 2, counting from the left in FIG. 2, the first column is the LO ODU, the rate levels in all frames, such as the rate level of the ODU3, are marked as ODU3(L), and L is the Low Order; the second column is the HO ODU, the rate levels in all frames, such as the rate level of the ODU3, are marked as ODU3(H), and H is the High Order. The HO/LO is identical with the concept of high order/low order container in a Synchronous Digital Hierarchy (SDH), the LO ODU is equivalent to that a service layer is used to adapt services with different rates and formats, and the HO ODU is equivalent to that a tunnel layer is used to provide transmission capability with certain bandwidths, and this layering structure supports the separation between a service board card and a circuit board card, and thus more flexibility and economy can be brought to the network deployment.

Compared with the G.709 in 2003, the G.709 Amendment 3 and G.sup 43 have changed greatly, and new signal types are introduced, which include ODU0, ODU2e, ODU3e1, ODU3e2, flexible ODU (ODUflex) and ODU4. The new optical channel data unit ODU0 with a rate of 1.244 Gb/s is firstly introduced, the ODU0 can be cross-connected independently, and also can be mapped to the high order ODU (such as the ODU1, ODU2, ODU3 and ODU4). In order to adapt to the transmission for 100GE services, the ODU4 is introduced, and the rate is 104.355 Gb/s.

The ODU1 is mapped to the ODU2 and ODU3 and the ODU2 is mapped to the ODU3 for keeping a 2.5G tributary time slot mapping and multiplexing way of the original version G.709, and it is added that the ODU1 is mapped to 1.25G tributary time slots of the ODU2 and ODU3 and the ODU2 is mapped to a 1.25G tributary time slot of the ODU3; all the other new rates (the ODU0, ODU2e and ODUflex) are mapped to the ODU1, ODU2, ODU3 and ODU4 in the way of 1.25G tributary time slot mapping and multiplexing. According to the G.sup 43, the ODU2e can be mapped to a 2.5G tributary time slot of the ODU3e1, and the ODU2e also can be mapped to the 1.25G tributary time slot of the ODU3e1. Most of the low order ODUs have the same number of tributary time slots in the high order. However, the ODU2e is an exception, and the ODU2e needs to occupy 9 1.25G tributary time slots or 5 2.5G tributary time slots in the ODU3, but ODU2e needs to occupy 8 1.25G tributary time slots in the ODU4. FIG. 3 is a detailed mapping and multiplexing path structure of the G.709 standard and G.sup43 standard.

The idea of Flexible ODU was widely discussed at the ITU-T Q11/SG15 intermediate meeting in September, 2008 and the ITU-T SG15 plenary meeting in December, 2008 initially. The initial thought of Flexible ODU is to provide bit transparent transmission of the OTN for client signals with arbitrary bit rates. The ODUflex is currently expected to be used for supporting those new bit rates which can not be mapped to the ODU2, ODU3 or ODU4 effectively. The ODUflex is taken as one low order ODU; the number of tributary time slots which one ODUflex occupies is arbitrary integral multiples of tributary time slots of the high order ODUk. The ODUflex bandwidth can be adjusted dynamically.

Currently, the size of Packet ODUflex is recommended to be: n×1.24416 Gbit/s±20 ppm ($1 \leqslant n \leqslant 80$), and the size of CBR ODUflex is 239/238 times of the client signal rate. The newly defined ODUflex will not provide mapping for the client signals which have been mapped to the ODU0, ODU1, ODU2 and ODU3 any more. With regard to CBR client signals, it is the first choice to map the client signals to the ODUflex through the BMP, and the ODUflex rate is 239/238 times of the client signal rate (above the 2.5G client signal rate). With regard to Packet service client signals, it is currently discussed that the client signals are mapped to the ODUflex by using the GFP; ODUflex=n*1.24416G, wherein $1 \leqslant n \leqslant 80$; and the ODUflex bit rate is integer multiples of the number of tributary time slots of the high order ODUk.

After the G.709 standard of version 2003 is released, OTN devices are deployed abundantly after development for several years, and the latest G.709 standard are also changed largely, and after the newly deployed OTN devices are loaded with control planes, one end-to-end label switching path may control a great many old devices and new devices simultaneously, and the old devices can only support a 2.5G tributary time slot unit, and the new devices can support both the 2.5G tributary time slot unit and 1.25G tributary time slot unit; when one end-to-end label switching path goes through the old devices and new devices, the related interconnections during the management of end-to-end services become a technical problem existing in the reality.

An OTN standard always supports single stage ODU multiplexing. A subsequent result in an OTN v1 is one tributary time slot directly mapped by an ODU1 to an ODU3, which is not required to be firstly mapped to an ODU2. A motivation of the system architecture is to reduce complexity. In a normal evolution process of the system architecture, the newly added OTN functions are expected to have higher rates, and thus the concept of single stage multiplexing will be propelled forward more easily. That is to say, if all the rates increase upward, it may be very easy to use the single stage multiplexing continuously in the OTN system architecture.

As shown in FIG. 4, the network is the OTN network which has been deployed by operators, and the implementation of all node devices in the OTN network is based on the G.709 standard version released in 2003, and each node in the network does not support the ODU0 and ODUflex and is based on the 2.5G tributary time slot. With the larger-scale application of data services, the operators need to introduce applications of the ODU0 and ODUflex into the existing network, but when the applications of the ODU0 and ODUflex are introduced into the existing network, a problem of interconnection between the networks supporting the 1.25G Time slot (TS) and the deployed networks supporting the 2.5G TS exists, and if no other technologies are introduced, the operators have to upgrade all nodes in the existing network to support the ODU0 and ODUflex, and this certainly will destroy the OTN networks which have been invested by the operators and increase the additional costs of the operators.

In addition, after new OTN nodes are introduced into the existing network, how to control the end-to-end services is also the problem required to be solved. One end-to-end ODUk service may go through a great many old devices and new devices simultaneously, the old devices can only support the 2.5G tributary time slot unit, and the new devices can support both the 2.5G tributary time slot unit and 1.25G tributary time slot unit; when one end-to-end ODUk goes through the old devices and new devices, the related interconnections during the management of end-to-end services become a technical problem existing in the reality. Meanwhile, the problem of introducing services of the ODU0 and ODUflex into the OTN network to perform interconnection with the deployed networks also exists.

SUMMARY OF THE INVENTION

The technical problem required to be solved by the present invention is to provide a method and system for establishing an end-to-end service, an Optical Transport Network (OTN) and a signal transmission method, which can implement an end-to-end interconnection after new signal types are introduced in an automatically switched optical network of the OTN, protect the existing OTN network, and reduce additional development costs of operators.

In order to solve the above problem, the present invention provides a method for establishing an end-to-end service, which comprises:

acquiring link information in a network and multi-stage multiplexing capability constraint information supported by gateway network elements;

when an end-to-end path computation request is received, according to the link information and the multi-stage multiplexing capability constraint information supported by the gateway network elements, performing an end-to-end routing computation to acquire an end-to-end routing, and selecting a multi-stage multiplexing capability used on a gateway network element passed by the end-to-end routing; and configuring the end-to-end service, and configuring the selected multi-stage multiplexing capability to the gateway network element passed by the end-to-end routing.

The above method can further be characterized in that, in the step of selecting multi-stage multiplexing capability used on the gateway network element passed by the end-to-end routing, a minimization principle of multi-stage multiplexing layers and/or multi-stage multiplexing times is followed to select the multi-stage multiplexing capability used on the gateway network element passed by the end-to-end routing.

The above method can further be characterized in that, in the step of, when an end-to-end path computation request is received, according to the link information and the multi-stage multiplexing capability constraint information supported by the gateway network element, performing an end-to-end routing computation, when a multi-stage multiplexing capability which is used or can not be used on the gateway network element passed by the end-to-end routing is carried in the end-to-end path computation request, the multi-stage multiplexing capability which is used or can not be used on the gateway network element passed by the end-to-end routing carried in the end-to-end path computation request is used for the end-to-end routing computation.

The above method can further be characterized in that, the step of acquiring the multi-stage multiplexing capability constraint information supported by gateway network element comprises: acquiring the multi-stage multiplexing capability constraint information supported by the gateway network elements through an auto-discovery protocol or a routing protocol.

The above method can further be characterized in that, the step of configuring the end-to-end service, and configuring the selected multi-stage multiplexing capability on the gateway network element passed by the end-to-end routing comprises:

a control plane initiating an end-to-end connection establishment process through a signaling, and including the multi-stage multiplexing capability selected on the gateway network element passed by the end-to-end routing; when the signaling reaches the gateway network element, configuring the selected multi-stage multiplexing capability on the gateway network element.

The above method can further be characterized in that, a gateway network element for which a tunnel is required to be created is further appointed in the signaling; and the method further comprises:

when the signaling reaches a gateway network element, if a tunnel between the gateway network element and another gateway network element for which the tunnel is required to be created is not established, establishing the tunnel.

The present invention further provides a system for establishing an end-to-end service, which comprises:

a path computation entity, configured to: acquire link information in a network and multi-stage multiplexing capability constraint information supported by gateway network elements; when an end-to-end path computation request is received, according to the link information and the multi-stage multiplexing capability constraint information supported by the gateway network elements, perform an end-to-end routing computation to acquire an end-to-end routing, and select a multi-stage multiplexing capability used on a gateway network element passed by the end-to-end routing; and a path configuration entity, configured to: configure the end-to-end service, and configure the selected multi-stage multiplexing capability on the gateway network element passed by the end-to-end routing.

The above system can further be characterized in that, the path computation entity is configured to: when the multi-stage multiplexing capability used on the gateway network element passed by the end-to-end routing is selected, follow a minimization principle of multi-stage multiplexing layers and/or multi-stage multiplexing times.

The above system can further be characterized in that, the path computation entity is configured to: when a multi-stage multiplexing capability which is used or can not be used on the gateway network element passed by the end-to-end routing is appointed in the end-to-end path computation request, use the multi-stage multiplexing capability which is used or can not be used on the gateway network element passed by the end-to-end routing appointed in the end-to-end path computation request for the end-to-end routing computation.

The above system can further be characterized in that, the path computation entity is configured to: acquire the multi-stage multiplexing capability constraint information supported by the gateway network elements through an auto-discovery protocol or a routing protocol.

The above system can further be characterized in that, the path configuration entity is configured to: initiate an end-to-end connection establishment process through a signaling, include the multi-stage multiplexing capability selected on the gateway network element passed by the end-to-end routing in the signaling, and when the signaling reaches the gateway network element, configure the selected multi-stage multiplexing capability on the gateway network element.

The above system can further be characterized in that, a gateway network element for which a tunnel is required to be created on the end-to-end routing is appointed in the signaling; the path configuration entity is further configured to: when the signaling reaches a gateway network element, if a tunnel between the gateway network element and another gateway network element for which the tunnel is required to be created on the end-to-end routing is not established, establish the tunnel.

The present invention further provides a signal transmission method in an optical transport network, wherein, the optical transport network comprises a first subnetwork, a second subnetwork and a third subnetwork, the first subnetwork and the second subnetwork are interconnected through a first gateway network element, and the second subnetwork and the third subnetwork are interconnected through a second gateway network element, and the first gateway network element and the second gateway network element support a multi-stage multiplexing capability, and the first gateway network element and the second gateway network element are interconnected through the second subnetwork, the method comprises:

the first subnetwork transmitting an Optical channel Data Unit (ODU)i signal to the first gateway network element, the first gateway network element performing multi-stage multiplexing on the ODUi signal to be an ODUk signal, and transmitting the ODUk signal to the second gateway network element through an ODUk tunnel established between the first gateway network element and the second gateway network element;

after performing reverse conversion on the ODUk signal to be the ODUi signal, the second gateway network element transmitting the ODUi signal to the third subnetwork, wherein, the ODUi signal and the ODUk signal are different types of signals, i and k are different nonnegative integers, and i<k.

The above method can further be characterized in that, the first gateway network element and the second gateway network element further support a conversion between a 1.25G tributary time slot signal and a 2.5G tributary time slot signal.

The above method can further be characterized in that, the ODUi signal is ODU0, and the ODUk signal is ODU3; or, the ODUi signal is a flexible Optical channel Data Unit (ODUflex), and the ODUk signal is ODU4.

The present invention further provides an optical transport network, which comprises a first subnetwork, a second subnetwork and a third subnetwork, wherein, the first subnetwork and the second subnetwork are interconnected through a first gateway network element, and the second subnetwork and the third subnetwork are interconnected through a second gateway network element, and the first gateway network element and the second gateway network element support a multi-stage multiplexing capability, and the first gateway network element and the second gateway network element are interconnected through the second subnetwork, wherein:

the first gateway network element is configured to: receive an ODUi signal from the first subnetwork, perform multi-stage multiplexing on the ODUi signal to be an ODUk signal, and transmit the ODUk signal to the second gateway network element through an ODUk tunnel established between the first gateway network element and the second gateway network element;

the second gateway network element is configured to: after performing multi-stage demultiplexing on the ODUk signal to be the ODUi signal, transmit the ODUi signal to the third subnetwork, wherein, the ODUi signal and the ODUk signal are different types of signals, and k are different nonnegative integers, and i<k.

The above optical transport network can further be characterized in that, the first gateway network element and the second gateway network element further support a conversion between a 1.25G tributary time slot signal and a 2.5G tributary time slot signal.

The above optical transport network can further be characterized in that, the ODUi signal is ODU0, and the ODUk signal is ODU3; or, the ODUi signal is a flexible Optical channel Data Unit (ODUflex), and the ODUk signal is ODU4.

In the present invention, it is raised that gateway network elements are introduced into the existing network or the existing certain network elements are upgraded to the gateway network elements, and the Multi Stage Multiplexing is implemented on these gateway network elements, so as to be able to introduce applications of the ODU0 and ODUflex into the deployed network, solve the interconnection between the network supporting 1.25G TS and the deployed network supporting 2.5G TS, and complete the conversion between the 1.25G TS signal and the 2.5G TS signal, which can not only protect the existing OTN network investments of operators, but also introduce new ODUk applications into the invested OTN network.

PREFERRED EMBODIMENTS OF THE PRESENT INVENTION

Figure 1:
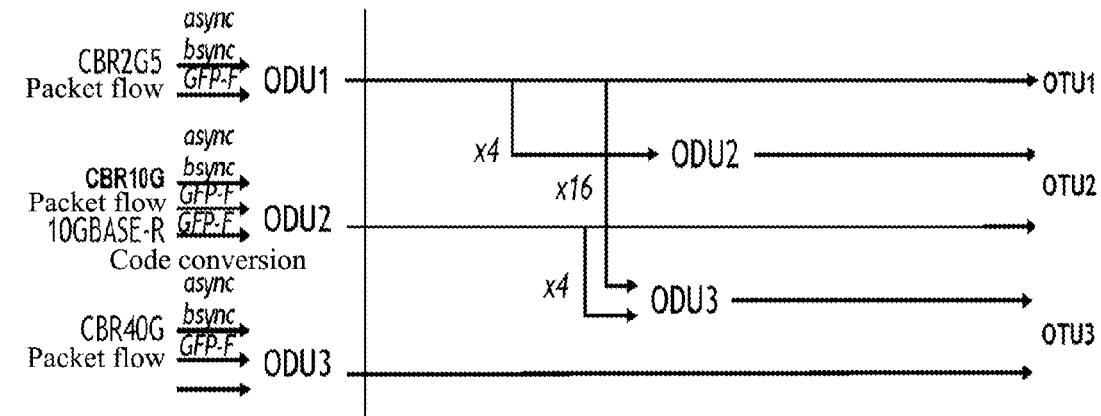
FIG. 1 is a mapping and multiplexing structure possessed by the G.709 standard published in 2003.
Figure 2:
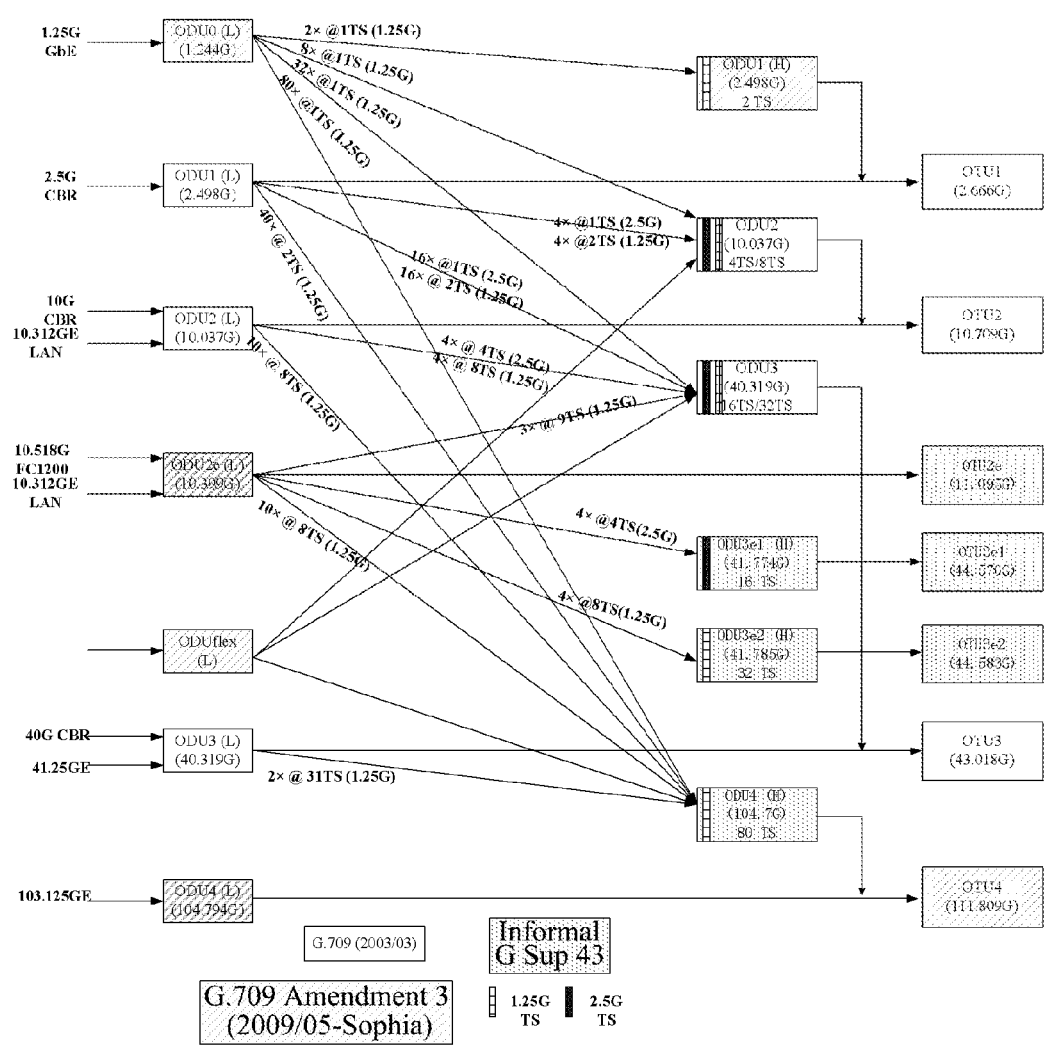
FIG. 2 is a mapping and multiplexing structure possessed by the G.709 Amendment3 and G.sup 43 standard.
Figure 3:
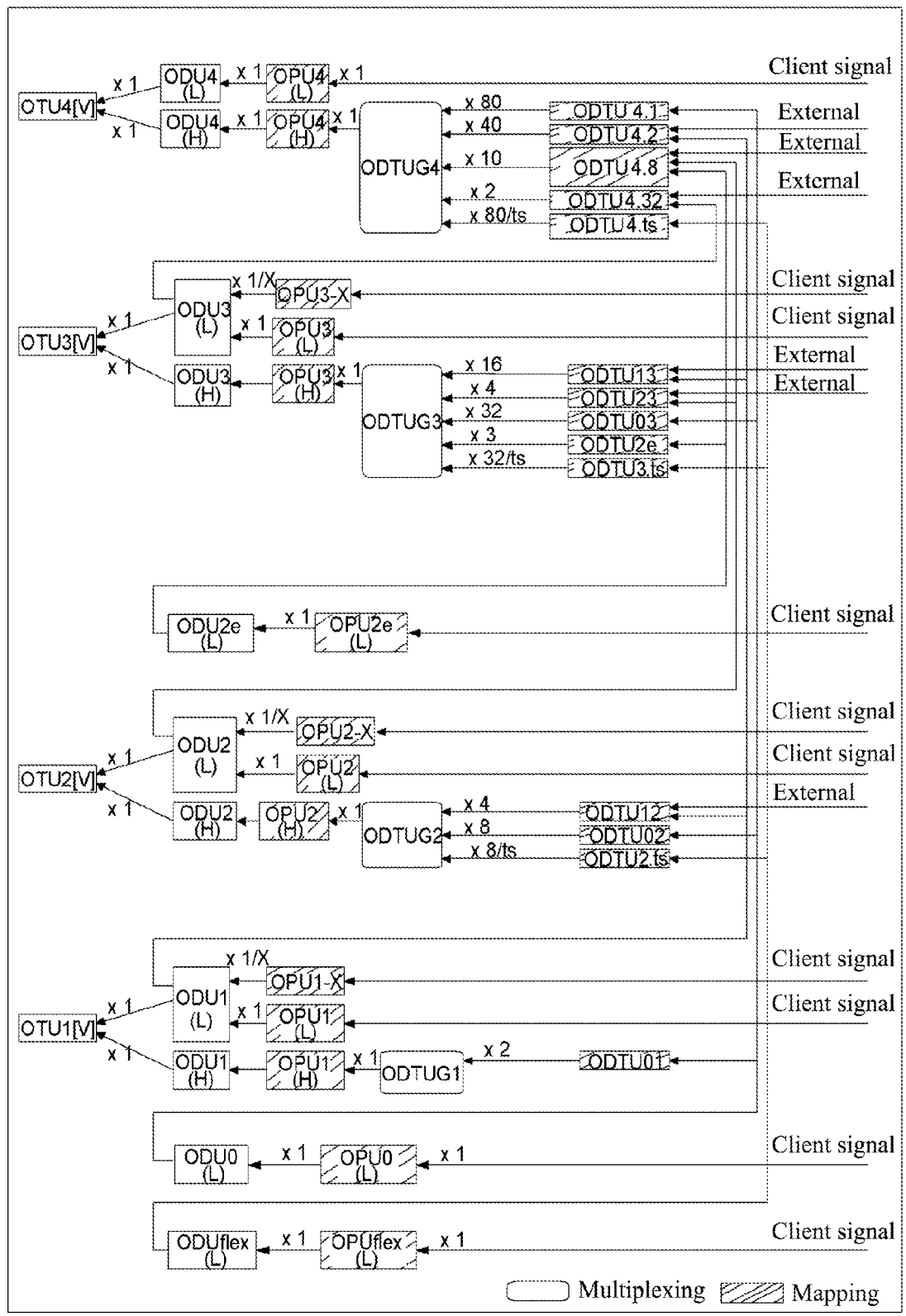
FIG. 3 is a detailed mapping and multiplexing structure of the G.709 standard and G.sup 43 standard.

The present invention will be further described in combination with the accompanying drawings and specific examples below.

An ODU0 and an ODUflex are introduced into the OTN layer architecture, which makes the newly added ODUk signal rates much lower than the existing rates, and this will bring some different challenges since the newly added rates can be clients of the existing rates. Therefore, an extremely distinct application exists, two stage multiplexing is expected to assist in introducing signals of ODU0 and ODUflex into the existing network, and thus it is not required to update each node in the existing network. When the two stage multiplexing is used on certain nodes in one domain, operators can be permitted to apply new rate limitations to those nodes which only need to support these new rates.

One OTN network may be a client layer of another OTN network. For example, if an operator A may have an OTN network composed of a low order ODUi and a high order ODUj (i<j), the high order ODUj in the operator A is borne to an operator B through OTUj, and the operator B takes the ODUj as a low order ODUj to be borne to a high order ODUk (j<k). Inside the operator A or operator B, two layers of ODU exist, but the high order ODUj in the operator A becomes the low order ODUj in the operator B.

The two stage multiplexing is expected to assist in introducing the signals of ODU0 and ODUflex into the existing network, and thus it is not required to update each node in the existing network. However, it is required to introduce Gateway network elements to support multi stage multiplexing.

In the present invention, the Gateway network elements are introduced and the Multi Stage Multiplexing is implemented on the gateway network elements, so as to assist in introducing applications of the ODU0 and ODUflex into the deployed network, which completes the conversion between a 1.25G TS signal and a 2.5G TS signal, and solves the interconnection between the network supporting 1.25G TS and the deployed network supporting 2.5G TS.

The present invention provides an optical transport network, the optical transport network at least includes a first subnetwork, a second subnetwork and a third subnetwork, the first subnetwork and the second subnetwork are interconnected through a first gateway network element, the second subnetwork and the third subnetwork are interconnected through a second gateway network element, and the first gateway network element and the second gateway network element are interconnected through the second subnetwork, and the first gateway network element and the second gateway network element support a multi-stage multiplexing capability and a conversion between a 1.25G tributary time slot signal and a 2.5G tributary time slot signal, wherein:

the first gateway network element is configured to: receive an ODUi signal from the first subnetwork, perform multi-stage multiplexing on the ODUi signal to be an ODUk signal, and transmit the ODUk signal to the second gateway network element through an ODUk tunnel established between the first gateway network element and the second gateway network element;

the second gateway network element is configured to: after performing multi-stage demultiplexing on the ODUk signal to be the ODUi signal, transmit the ODUi signal to the third subnetwork, wherein, the ODUi signal and the ODUk signal are different types of signals.

For example, the ODUi signal can be an ODU0, and the ODUk signal can be an ODU3, the ODU0 is firstly multiplexed as ODU1/ODU2, and the ODU1/ODU2 is then multiplexed as the ODU3; or, the ODUi signal can be an ODUflex, and the ODUk signal can be ODU4, the ODUflex is firstly multiplexed as ODU2/ODU3, and the ODU2/ODU3 is then multiplexed as the ODU4, thereby implementing the interconnection between the network supporting the ODU0/ODUflex and the existing network only supporting the ODU2/3/4. Certainly, the ODUi signal is not limited to the ODU0/ODUflex, and also can be other signal types according to the service demands.

The optical transport network also can include more gateway network elements, and corresponding tunnels are established between the gateway network elements according to the multi-stage multiplexing capabilities and service demands supported by the gateway network elements, which implements the interconnection between different networks.

The present invention also provides a signal transmission method in an optical transport network, and the optical transport network at least includes a first subnetwork, a second subnetwork and a third subnetwork, the first subnetwork and the second subnetwork are interconnected through a first gateway network element, the second subnetwork and the third subnetwork are interconnected through a second gateway network element, and the first gateway network element and the second gateway network element are interconnected through the second subnetwork, and the first gateway network element and the second gateway network element support a multi-stage multiplexing capability and a conversion between a 1.25G tributary time slot signal and a 2.5G tributary time slot signal, wherein:

an ODUi signal of the first subnetwork is transmitted to the first gateway network element, and the first gateway network element performs multi-stage multiplexing on the ODUi signal to be an ODUk signal, and transmits the ODUk signal to the second gateway network element through an ODUk tunnel established between the first gateway network element and the second gateway network element;

after performing multi-stage demultiplexing on the ODUk signal to be the ODUi signal, the second gateway network element transmits the ODUi signal to the third subnetwork, wherein, the ODUi signal and the ODUk signal are different types of signals.

The ODUi signal can be ODU0, and the ODUk signal can be ODU3; or, the ODUi signal can be ODUflex, and the ODUk signal can be ODU4.

The present invention provides a method for establishing an end-to-end ODUk service through a management plane or a control plane, and following steps are included.

In step S1, the management plane or control plane obtains detailed information of each link in an OTN network, and the information includes a granularity size of tributary time slot supported by the link, the maximum number of supported tributary time slots (i.e. the maximum bandwidth of the link), the number of tributary time slots available for the current link and a low order signal type supported by the link.

Figure 7:
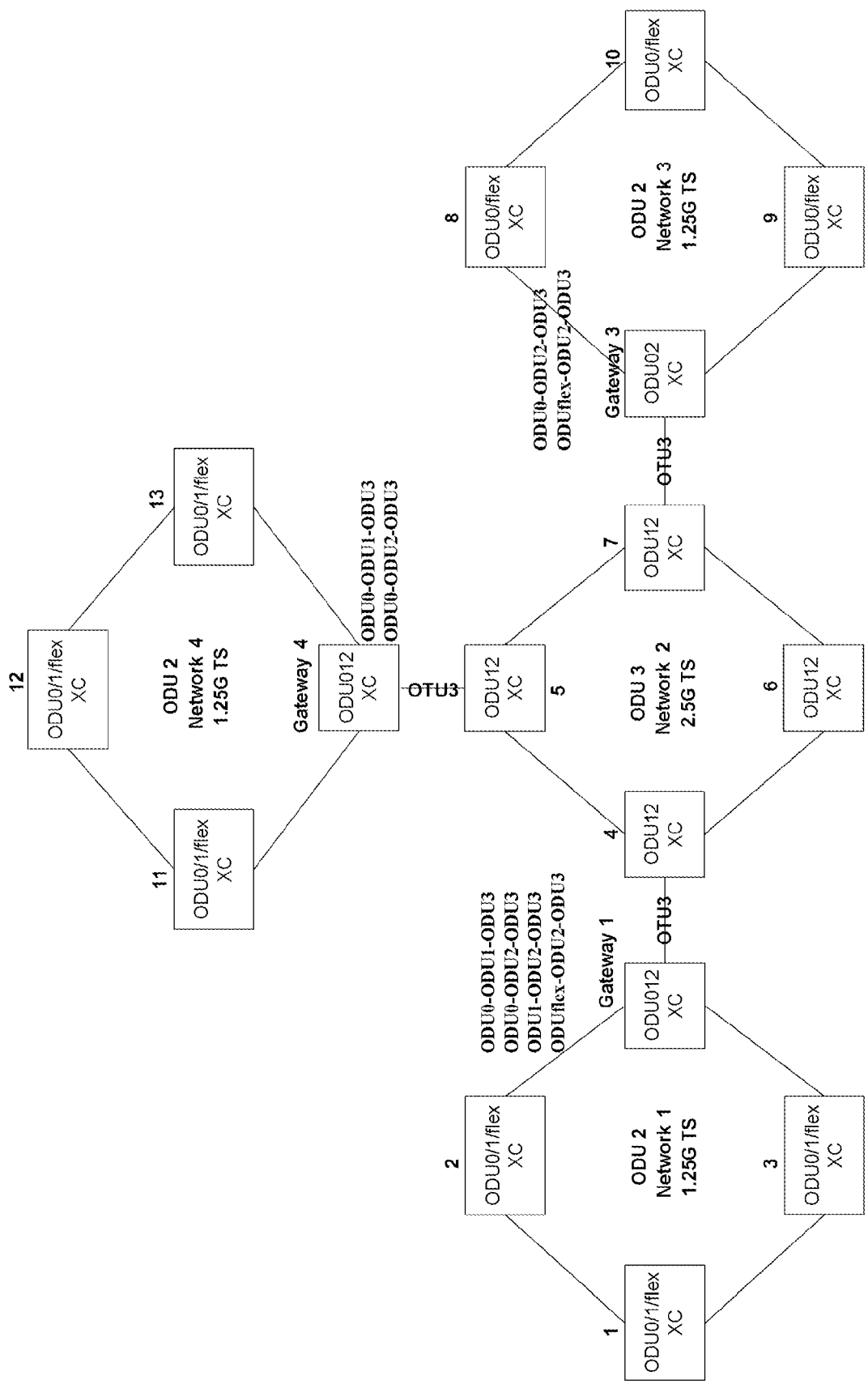
FIG. 7 is a network structure of introducing gateway network elements supporting multi stage multiplexing when an OTN device supporting signals of ODU0 and ODUflex is added to the existing network shown in FIG. 4. Multi stage multiplexing capabilities supported by the gateway network elements are different.

In step S2, before computing an end-to-end ODUk service, the management plane or control plane must obtain multi-stage multiplexing capability constraint information (a single-stage multiplexing capability can be deduced through the low order signal type supported by the link) supported by gateway network elements (such as the gateway network elements Gateway 1, Gateway3 and Gateway4 in FIG. 7).

Wherein, the management plane can use the related art (such as the method of a node reporting initiatively or the management plane collecting initiatively) to obtain multi-stage multiplexing capabilities of the gateway network elements; a path computation entity in the control plane can obtain the multi-stage multiplexing capabilities of the gateway network elements through extending an auto-discovery protocol or a routing protocol.

As shown in FIG. 7, with regard to links located between the Gateway 1 and node 4 and between the Gateway 3 and node 7, since an ODU0 can be mapped to an ODU3 Network 2 through the two-stage multiplexing/demultiplexing (that is, the ODU0 can be mapped to an ODU1 or ODU2, and then the ODU1 or ODU2 are mapped to an ODU3), if only low order signals supported by these links are known, it is not enough for the path computation entity to compute a routing, and it is also required to know the way in which the ODU0 is mapped to the ODU3 Network 2, that is, the multi stage multiplexing capability constraint information supported by the links between the Gateway 1 and node 4 and between the Gateway 3 and node 7 must be known by the path computation entity.

In step S3, the path computation entity of the management plane or control plane (such as a Path Computation Element (PCE)) uses the information obtained in the steps S1 and S2 for an end-to-end routing computation, obtains an end-to-end routing, and selects the multi-stage multiplexing capabilities used on the gateway network elements passed by the end-to-end routing.

The path computation entity uses the obtained multi-stage multiplexing capability constraint information of the gateway network elements for an end-to-end ODUk service path computation. In the process of routing computation, when the end-to-end ODUk service goes through multiple gateway network elements, the path computation entity must select the multi-stage multiplexing and demultiplexing capabilities used on these gateway network elements for the end-to-end ODUk service.

When the path computation entity selects the multi-stage multiplexing capabilities on the passed gateway network elements, a minimization principle of multi-stage multiplexing layers and/or multi-stage multiplexing times is followed. For example, it should try not to use the multi-stage multiplexing or the number of multiplexing layers is less as possible, e.g. if there are ODU0-ODU2-ODU3 and ODU0-ODU1-ODU2-ODU3 available for selection, the ODU0-ODU2-ODU should be selected.

In step S4, after the routing computation is completed, the nodes and links passed by the end-to-end service and the multi-stage or single-stage multiplexing/demultiplexing capabilities selected on the gateway network elements are determined, and the end-to-end service is configured through the management plane or control plane, and the selected multi-stage multiplexing capabilities are configured on the gateway network elements passed by the end-to-end routing.

When the control plane establishes the end-to-end ODUk service in a distributed signaling way, the multi-stage multiplexing/demultiplexing capabilities selected by the path computation entity to be used on the gateway network elements are included in a signaling message.

When the signaling (Path or Resv) message including information of the multi-stage multiplexing/demultiplexing capabilities used on the gateway network elements goes through the gateway network elements, the included multi-stage multiplexing capabilities are configured to a data plane for an end-to-end ODUk connection being created.

A gateway network element for which relevant tunnels are required to be created on the end-to-end routing is also appointed in the signaling; when the signaling message reaches a gateway network element, if the relevant tunnels between the gateway network element and its corresponding gateway network element have not been established, the tunnels will be established.

As shown in FIG. 7, when an ODU0/ODUflex end-to-end service needs to go through the ODU3 Network 2, since the ODU3 Network 2 can not support ODU0/ODUflex switching directly, the ODU0 is firstly mapped to the ODU1/ODU2 in the gateway network elements, and then the ODU1/ODU2 are mapped to the ODU3; the nodes of the ODU3 Network 2 are not required to see the ODU0 but switch the ODU1 or ODU2 directly. Therefore, one tunnel of the ODU1 or ODU2 needs to be established between the Gateway 1 and Gateway 3, that is to say, an ODUj (such as the ODU1 or ODU2) connection (i<j) with a rate higher than that of an end-to-end ODUi (such as the ODU0) connection, which is required to be borne, to be established needs to be established between a pair of related gateway network elements. Since the path computation entity can know the multi stage multiplexing capability constraint information selected on the passed gateway network elements, the path computation entity knows the gateway network elements between which the related tunnels are required to be created, and the gateway network elements for which the tunnels need to be created can be appointed explicitly in the signaling message. Furthermore, the ODUj (such as the ODU1 or ODU2) connection (i<j) with the rate higher than that of the end-to-end ODUi (such as the ODU0) connection, which is required to be borne, to be established is created between the pair of appointed and related gateway network elements.

The present invention also provides a system for establishing an end-to-end service, which comprises:

a path computation entity, configured to: acquire link information in a network and multi-stage multiplexing capability constraint information supported by gateway network elements; when an end-to-end path computation request is received, according to the link information and the multi-stage multiplexing capability constraint information supported by the gateway network elements, perform an end-to-end routing computation to acquire an end-to-end routing, and select a multi-stage multiplexing capability used on a gateway network element passed by the end-to-end routing;

a path configuration entity, configured to: configure the end-to-end service, and configure the selected multi-stage multiplexing capability on the gateway network element passed by the end-to-end routing.

Wherein, the path computation entity is configured to: when the multi-stage multiplexing capability used on the gateway network element passed by the end-to-end routing is selected, follow a minimization principle of multi-stage multiplexing layers and/or multi-stage multiplexing times.

Wherein, the path computation entity is configured to: when a multi-stage multiplexing capability which is used or can not be used on the gateway network element passed by the end-to-end routing is appointed in the end-to-end path computation request, use the multi-stage multiplexing capability used on the gateway network element passed by the end-to-end routing appointed in the end-to-end path computation request for the end-to-end routing computation.

Wherein, the path computation entity acquires the multi-stage multiplexing capability constraint information supported by the gateway network elements through an auto-discovery protocol or a routing protocol.

Wherein, the path configuration entity is configured to: initiate an end-to-end connection establishment process, include the multi-stage multiplexing capability selected on the gateway network element passed by the end-to-end routing in a signaling, and when the signaling reaches the gateway network element, configure the selected multi-stage multiplexing capability on the gateway network element.

In addition, a gateway network element for which relevant tunnels are required to be created on the end-to-end routing is appointed in the signaling; the path configuration entity is further configured to: when the signaling reaches a gateway network element, if the relevant tunnels between the gateway network element and the gateway network element for which relevant tunnels are required to be created on the end-to-end routing are not established, establish the tunnels.

Example 1

Figure 4:
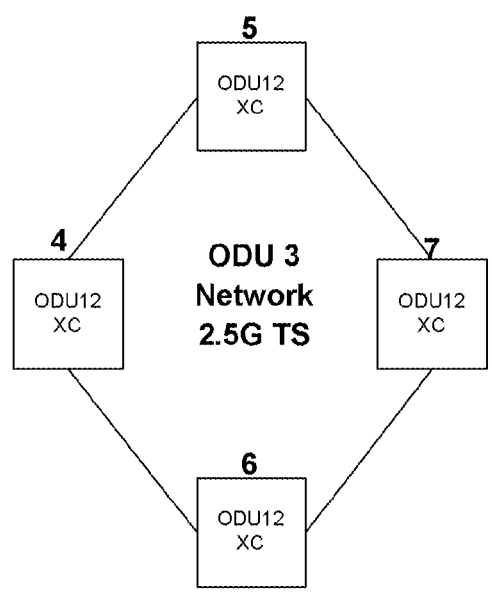
FIG. 4 is an OTN network which has been invested and deployed by the operators, and the implementation of all node devices in the network is based on the G.709 standard released in 2003, and each node in the network does not support the ODU0 and ODUflex and is based on the 2.5G tributary time slot.

In order to introduce signals of ODU0 and ODUflex into the existing network shown in FIG. 4 without a need to update the deployed nodes (4, 5, 6 and 7) in the existing network, Gateway network elements are introduced in the present invention, and Multi Stage Multiplexing is implemented on these gateway network elements to assist in introducing applications of ODU0 and ODUflex into the deployed network, which completes the conversion between a 1.25G TS signal and a 2.5G TS signal, and solves the interconnection between the network supporting 1.25G TS and the deployed network supporting 2.5G TS.

When an end-to-end ODUk service goes through multiple gateway network elements, a path computation entity must select corresponding multi-stage multiplexing and demultiplexing capabilities on these gateway network elements for the end-to-end ODUk service.

Figure 5:
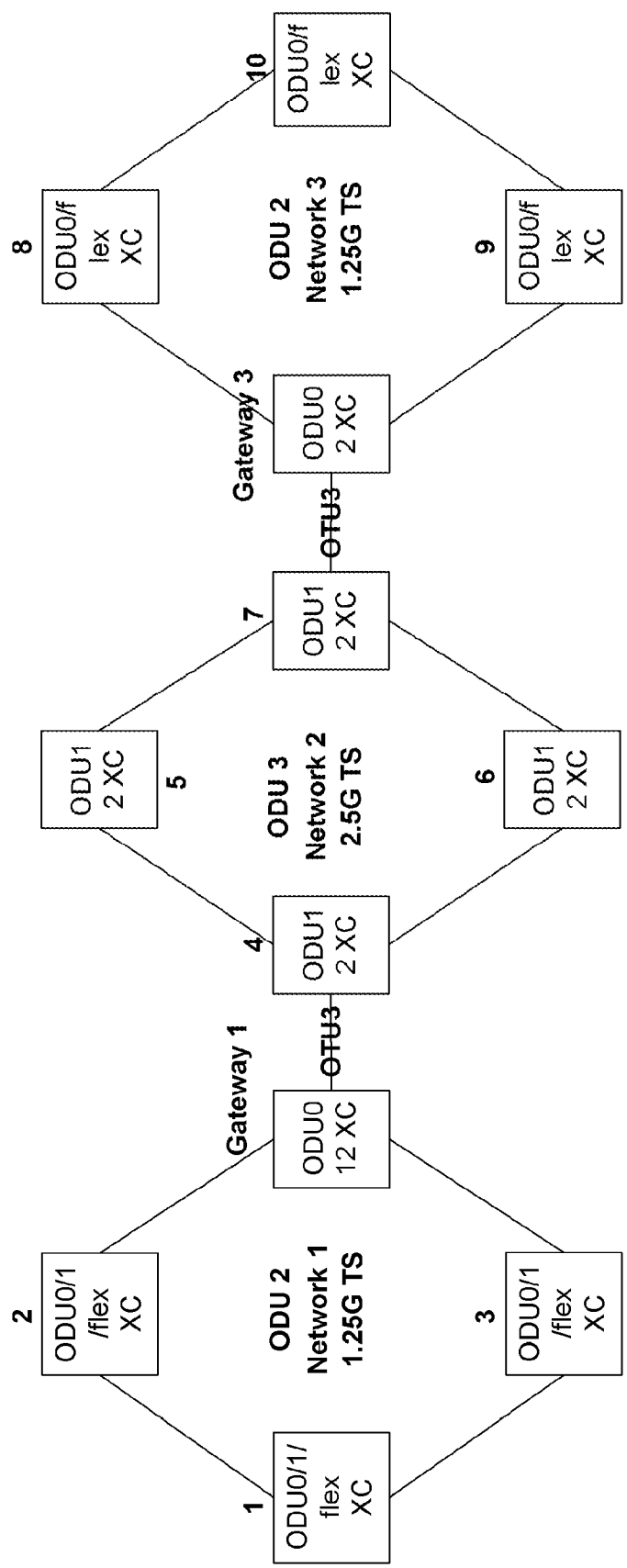
FIG. 5 is a network structure of introducing gateway network elements supporting multi stage multiplexing when an OTN device supporting signals of ODU0 and ODUflex is added to the existing network shown in FIG. 4. Since the gateway network elements are introduced, it is not required to update each node in the existing network.

After upgrading the network shown in FIG. 4, the network shown in FIG. 5 is obtained, and a specific upgrade way may be described as follows.

1) It is possible that the original network only consists of the nodes 4, 5, 6 and 7, and as it wish that the network support the ODU0, nodes 1, 2, 3, 8, 9 and 10 and Gateway nodes are added.

2) Or it is possible that the original network includes the nodes 4, 5, 6 and 7 and two nodes connected to the nodes 4 and 7, and these two nodes need to be upgraded to support the ODU0 and become the Gateway nodes.

As shown in FIG. 5, on these Gateway network elements, the ODU0 is firstly mapped to ODU1/ODU2, and then the ODU1/ODU2 are mapped to ODU3; the other nodes (4, 5, 6 and 7) in an ODU3 Network 2 are not required to see the ODU0 but switch the ODU1 or ODU2 directly, which can not only protect the existing investments of operators, but also introduce new applications and services to provide added value to the existing network investments of the operators.

Figure 6:
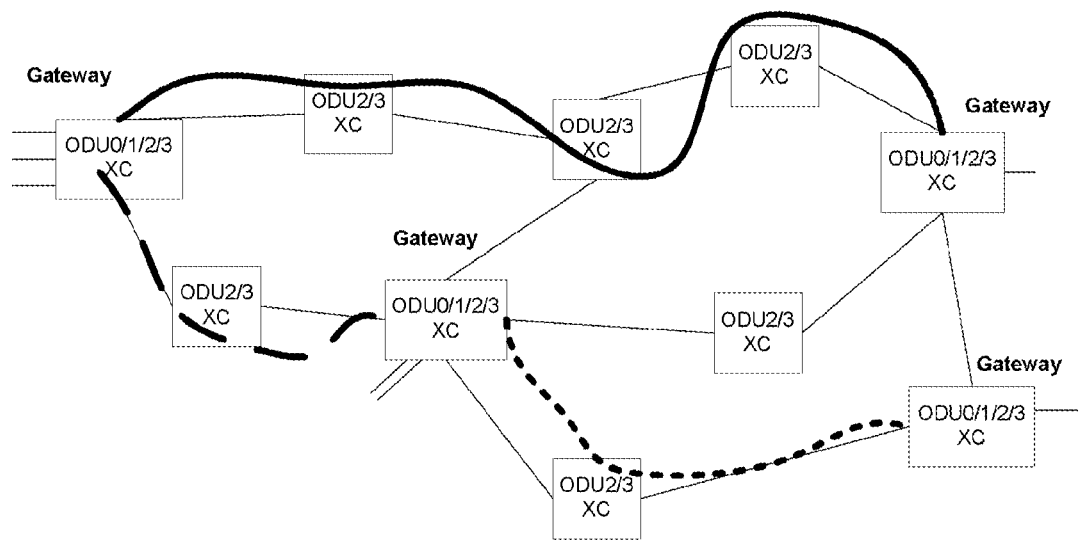
FIG. 6 is one structure diagram of OTN of the network design based on tunnels, gateway network elements are introduced, and the ODU0 and ODUflex are firstly multiplexed to the ODU2 or ODU3 to minimize the number of connections required to be created at intermediate nodes.

In addition, besides the network upgrade scenario, the second potential multi-stage multiplexing application is a network design based on tunnels. In one ODU4 network, each ODU4 has 80 tributary time slots. It is assumed that a large number of ODU0s and ODUflexs need 3-4 tributary time slots. If a great quantity of circuit services share the same terminal point (or even a part of the whole path), from a management perspective, the Gateway network elements are introduced, and the ODU0 and ODUflex are firstly multiplexed to the ODU2 or ODU3 to minimize the number of connections required to be created at intermediate nodes, which can save much cost. The ODU2/ODU3 effectively creates one tunnel used by the ODU0/ODUflex and going through the ODU4 network. In the ODU4 network as shown in FIG. 6, the ODU0/ODUflex is only visible to the gateway network elements. Though the multi-stage multiplexing increases the complexity of the gateway network elements, it reduces the number of ODU0 or ODUflex cross connections required to be configured at other non gateway network element nodes.

Example 2

In the example, the step S3 in the method for establishing the end-to-end service will be further described.

As shown in FIG. 7, after introducing the Gateway network elements into the existing network and deploying the OTN device nodes implemented according to the latest version of G.709 standard, three 10G OTN networks and one 40G OTN network are constituted, the granularity size of tributary time slot supported by each link in the 10G OTN networks is the 1.25G TS. Wherein, the three 10G OTN networks are interconnected with the 40G OTN network through the gateway network elements Gateway 1, Gateway 3 and Gateway 4, and links between the three 10G OTN networks and the 40G OTN networks are OTU3 links. The switching capabilities supported by the nodes in the three 10G OTN networks are also different. Wherein, nodes 1, 2 and 3 and the Gateway 1 in the ODU2 Network 1 only support the switching capabilities of the ODU0, ODU1 and ODUflex; nodes 11, 12 and 13 and the Gateway 4 in the ODU2 Network 4 only support the switching capabilities of the ODU0, ODUflex and ODU1; and nodes 8, 9 and 10 and the Gateway 3 in the ODU2 Network 3 only support the switching capabilities of the ODU0 and ODUflex. The reason is that the operators only want the ODU2 Network 3 to be responsible for accessing 1 GigE (ODU0) and 10 GigE (ODU2/ODU2e) services, thus only performing ODU0/ODU2 switching is more economic, and since no ODU1 service (such as STM-16) is accessed, it is unnecessary to perform ODU1 switching on these nodes. In the network of the example, the multi-stage multiplexing capability constraint information supported by the gateway network elements is shown as follows.

The multi stage multiplexing capabilities supported by the network element Gateway 1 include:
ODU0-ODU1-ODU3
ODU0-ODU2-ODU3
ODU1-ODU2-ODU3
ODUflex-ODU2-ODU3

The multi stage multiplexing capabilities supported by the network element Gateway 3 include:
ODU0-ODU2-ODU3
ODUflex-ODU2-ODU3
The multi stage multiplexing capabilities supported by the network element Gateway 4 include:
ODU0-ODU1-ODU3
ODU0-ODU2-ODU3

The reason why the Gateway 4 does not support the ODUflex-ODU2-ODU3 multi-stage multiplexing is mainly that the relevant ODUflex applications considered by the operators are only limited to the interior of the ODU2 Network 4, no ODUflex beyond the scope of the ODU2 Network 4 exists. That is to say, the ODUflex applications will not go through the ODU3 Network 2, and thus the network element Gateway 4 is unnecessary to support the ODUflex-ODU2-ODU3 multi-stage multiplexing.

Meanwhile, the Gateway 1, Gateway 3 and Gateway 4 all support the following single-stage multiplexing capabilities, and can obtain the following single-stage multiplexing capability information through the related art:
ODU1-ODU3; ODU2-ODU3

Figure 8:
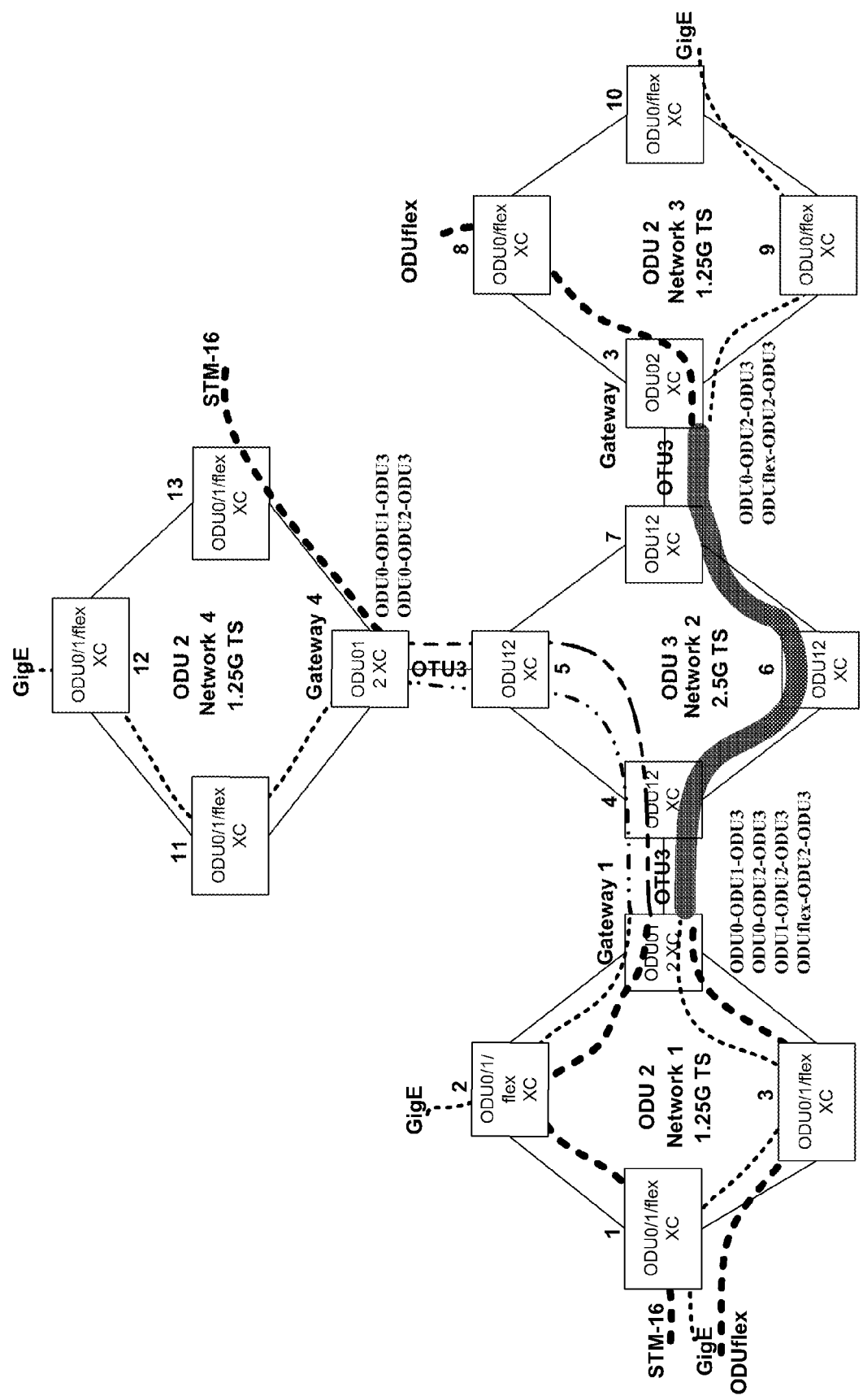
FIG. 8 is a schematic diagram of an end-to-end ODUk service based on FIG. 7, wherein, two end-to-end ODU0 services (namely GigE1 and GigE2 respectively), one ODU1 (STM-16 1) service and one ODUflex service (ODUflex 1) are included.

The path computation entity receives the following 5 end-to-end service establishment requests as shown in FIG. 8, which includes:

one GigE (ODU0) end-to-end service from the node 1 to the node 10, wherein, the service is marked as GigE 1;

one GigE (ODU0) end-to-end service from the node 2 to the node 12, wherein, the service is marked as GigE 2.

one STM-16 end-to-end service from the node 1 to the node 13, wherein, the service is marked as STM-16 1;

one ODUflex end-to-end service from the node 1 to the node 8, wherein, the bandwidth demand size is 5*1.25G, and the service is marked as ODUflex1;

one ODUflex end-to-end service from the node 1 to the node 12, wherein, the bandwidth demand size is 6*1.25G.

The specific steps for implementing the routing computation with respect to the request are described as follows.

In step (11), the path computation entities of the management plane and the control plane use the related art to compute one available end-to-end routing for the end-to-end service establishment request, e.g. the passed nodes are 1, 3, Gateway 1, 4, 6, 7, Gateway 3, 9 and 10.

In step (12), since the Gateway 3 only supports the two-stage multiplexing and demultiplexing capability of the ODU0-ODU2-ODU3 with respect to the ODU0 service, even though the Gateway 1 supports the multiplexing and demultiplexing capabilities of the ODU0-ODU1-ODU3 and ODU0-ODU2-ODU3, the path computation entities can only select the corresponding multi-stage multiplexing and demultiplexing capabilities of the ODU0-ODU2-ODU3 on the Gateway 1 and Gateway 3 for the end-to-end ODU0 service, otherwise signals can not be transmitted from end to end.

The specific steps for implementing the routing computation with respect to the request ② are described as follows.

In step (21), the path computation entities of the management plane and the control plane use the related art to compute one available end-to-end routing for the end-to-end service establishment request ②, e.g. the passed nodes are 2, Gateway 1, 4, 5, Gateway 4, 11 and 12.

In step (22), since the Gateway 1 and Gateway 4 both support the two-stage multiplexing and demultiplexing capabilities of the ODU0-ODU1-ODU3 and ODU0-ODU2-ODU3 with respect to the ODU0 service, the path computation entities can select an identical two-stage multiplexing and demultiplexing capability on these two gateway network elements according to a certain policy. For example, since the service ① has selected the multiplexing and demultiplexing capability of the ODU0-ODU2-ODU3 in Gateway 1, if numerous ODU0 services still go through the same ODU2 tunnel together with the service ① in the future (that is, all other ODU0 services are multiplexed to the same ODU2 in the future and go through the identical nodes Gateway 1, 4, 6, 7 and Gateway 3), and since the service ② and service ① go through an identical section of OTU3 link (located between the Gateway1 and the node 4) but go through different nodes and routings (the service ② going through the Gateway 1, 4, 5 and Gateway 4) in the ODU3 Network 2, in order to reserve enough capacity for the other ODU0 services which will go through the same ODU2 tunnel together with the service ① in the future on the OTU3 link, the service ② needs to try to select other multi-stage multiplexing capabilities different from that of the service ① on the node Gateway 1, e.g. the ODU0-ODU1-ODU3 is selected.

An end-to-end ODUk service establishment request also can appoint to select a specific multi-stage multiplexing capability on a specific gateway network element. For example, the request ② appoints to use the multi-stage multiplexing capability of the ODU0-ODU2-ODU3 on the Gateway 1 and Gateway 4, thus, the path computation entities must select the multi-stage multiplexing capability (method) appointed by the service establishment request on Gateway 1 and Gateway 4. That certain multi-stage multiplexing capabilities (methods) can not be used also can be appointed. For example, it is appointed that the ODU0-ODU2-ODU3 can not be used, at this point, the path computation entities can only select the multi-stage multiplexing capability (method) of the ODU0-ODU2-ODU3 for the end-to-end ODUk service establishment request.

The specific steps for implementing the routing computation with respect to the request ③ are described as follows.

In step (31), the path computation entities of the management plane and the control plane use the related art to compute one available end-to-end routing for the end-to-end service establishment request ③, e.g. the passed nodes are 1, 2, Gateway 1, 4, 5, Gateway 4 and 13.

In step (32), since the Gateway 1 supports the two-stage multiplexing and demultiplexing capability of the ODU1-ODU2-ODU3 with respect to the ODU1 service, but the Gateway 4 can not support the two-stage multiplexing and demultiplexing capability of the ODU1-ODU2-ODU3, and the nodes 4, 5, 6 and 7 in the ODU3 Network 2 all support the switching capability of the ODU1, the path computation entities make a priority selection of the single-stage multiplexing capability ODU1-ODU3 on the Gateway 1 and Gateway 4, which can reduce the complexity of the end-to-end service. However, the nodes Gateway 1 and Gateway 4 need to complete the interconversion between the 1.25G TS signal and 2.5G TS signal.

The specific steps for implementing the routing computation with respect to the request ④ are described as follows.

In step (41), the path computation entities of the management plane and the control plane use the related art to compute one available end-to-end routing for the end-to-end service establishment request ④, e.g. the passed nodes are 1, 3, Gateway 1, 4, 6, 7, Gateway 3 and 8.

In step (42), since the Gateway 1 and Gateway 3 only support the two-stage multiplexing and demultiplexing capability of the ODUflex-ODU2-ODU3 with respect to the ODUflex service, the path computation entities can only select the ODUflex-ODU2-ODU3 multi-stage multiplexing on the Gateway 1 and Gateway 3 for the ODUflex end-to-end service.

In step (43), the ODUflex service in the request ④ and the ODU0 service in the request ① go through the same pair of gateway network elements. In order to fully use bandwidth resources of the ODU3 Network 2, the ODUflex service in the request ④ and the ODU0 service in the request ① share a section of ODU2 tunnel, but it is required to configure different multi-stage multiplexing capabilities (methods) at the same port on the same gateway network element node for these two services.

The specific steps for implementing the routing computation with respect to the request ⑤ are described as follows.

In step (51), the path computation entities of the management plane and the control plane use the related art to compute one available end-to-end routing for the end-to-end service establishment request ⑤, e.g. the passed nodes are 1, 2, Gateway 1, 4, 5, Gateway 4, 11 and 12.

In step (52), however, since the Gateway 4 does not support the multi-stage multiplexing capability of the ODUflex-ODU2-ODU3 with respect to the ODUflex service, ODUflex signals can not be transmitted in the paths computed in the step (51), and with respect to the request ⑤, the routing computation of the path computation entities fails.

Example 3

In the example, the step S3 in the method for establishing the end-to-end service will be further described.

Figure 9:
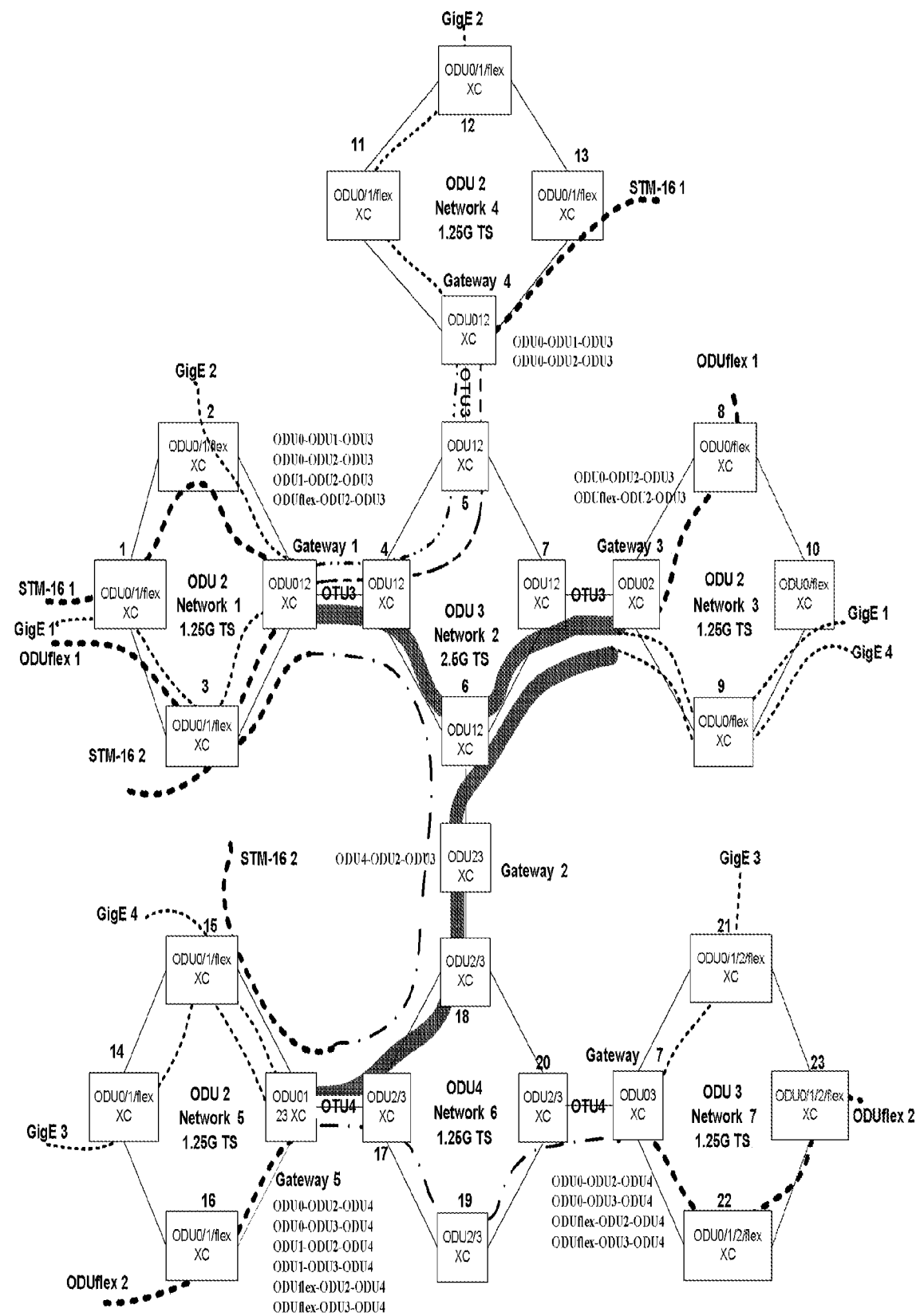
FIG. 9 is one schematic diagram of an OTN composed from interconnections of one 10G OTN network, one 40G OTN network and one 100G OTN network further invested and established by the operators and the OTN network based on FIG. 8. Two end-to-end ODU0 services (namely GigE3 and GigE4 respectively), one ODU1 (STM-16 2) service and one ODUflex service (ODUflex2) are added.

The operators newly expand some OTN networks based on the invested OTN networks in FIG. 8. As shown in FIG. 9, the OTN networks newly invested and deployed by the operators are three networks, namely a 10G ODU2 Network 5, a 40G ODU3 Network 7 and a 100G ODU4 Network 6 respectively. In order to reduce the number of cross connections required to be configured with respect to the end-to-end services such as the ODU0 service and ODUflex service and so on inside the ODU4 Network 6, all nodes in the ODU4 Network 6 only perform switching capabilities of ODU2 (10G) and ODU3 (40G) granularity.

Wherein, most of ODU0/ODU1/ODUflex services inside the ODU2 Network 5 are local (that is to say, these services are limited to the interior of the ODU2 Network 5 and will not pass through the ODU4 Network 5). If some ODUk services exist, e.g. a GigE (ODU0) is accessed at a node 15, it is required to stride the ODU4 Network 6, and transmit the services to a node 21 in the ODU3 Network 7 through an ultra-long distance transmission capability of the ODU4 Network 6. With the related art, one ODU2 tunnel can be directly established between the node 15 and node 21, and then the ODU0 is directly multiplexed and demultiplexed to the ODU2 tunnel on the node 15 and node 21. However, the method has some defects, for if it is in the condition that the number of ODU0 services needing the ultra-long distance transmission is not large (e.g. only one such ODU0 end-to-end service exists), ODU2 tunnels are specially established for these services which have low rates and need the ultra-long distance transmission inside the ODU2 Network 5 and ODU3 Network 7, and in the condition that many local services can not share these tunnels inside the ODU2 Network 5 and ODU3 Network 7, the operators will waste plenty of bandwidths for such end-to-end services needing the ultra-long distance transmission. Therefore, the best method is to establish the ODU2 tunnels or ODU3 tunnels directly between a Gateway 5 and a Gateway 7, and these tunnels are shared by the services with low order rates crossing the ODU2 Network 5, ODU2 Network 6 and ODU3 Network 7, but these services with low order rates are scheduled directly inside the ODU2 Network 5 and ODU2 Network 7 respectively, and it is not required to establish the ODU2 tunnels or ODU3 tunnels in advance. However, gateway network elements need to be introduced, ODU0/ODU1/ODUflex are firstly mapped to an ODU2 or ODU3 on the Gateway 5 and Gateway 7, and then the ODU2 or ODU3 is mapped to ODU4.

Wherein, multi-stage multiplexing capability constraint information supported by the newly added gateway network elements is shown as follows.

The multi-stage multiplexing capabilities supported by the network element Gateway 5 include:
ODU0-ODU2-ODU4
ODU0-ODU3-ODU4
ODU1-ODU2-ODU4
ODU1-ODU3-ODU4
ODUflex-ODU2-ODU4
ODUflex-ODU3-ODU4

The multi-stage multiplexing capabilities supported by the network element Gateway 7 include:
ODU0-ODU2-ODU4
ODU0-ODU3-ODU4
ODUflex-ODU2-ODU4
ODUflex-ODU3-ODU4

The reason why the Gateway 7 does not support the multi-stage multiplexing capability of the ODU1-ODU2-ODU4 or ODU1-ODU3-ODU4 is that, relevant ODU1 applications considered by the operators are only limited to the interior of the ODU3 Network 7, and no ODU1 beyond the scope of the ODU3 Network 7 exists. That is to say, the ODU1 applications will not go through the ODU3 Network 7, and thus the network element Gateway 7 is unnecessary to support the ODU1-ODU2-ODU4 multi-stage multiplexing or ODU1-ODU3-ODU4 multi-stage multiplexing.

The multi-stage multiplexing capability supported by the network element Gateway 2 includes:

ODU4-ODU2-ODU3: it means that, when ODU3 signals (encapsulating ODU2 signals) from the ODU3 Network 2 go through the gateway network element Gateway 2, the ODU2 signals are required to be demultiplexed from the ODU3 signals through the demultiplexing and then encapsulated into ODU4 signals through the multiplexing. Conversely, when the ODU4 signals (encapsulating the ODU2 signals) from the ODU4 Network 6 go through the gateway network element Gateway 2, the ODU2 signals are required to be demultiplexed from the ODU4 signals through the demultiplexing and then encapsulated into the ODU3 signals through the multiplexing. Meanwhile, the Gateway 2 completes the conversion between a 1.25G tributary time slot and a 2.5G tributary time slot.

The path computation entity receives the following 4 end-to-end service establishment requests as shown in FIG. 9, which include:

⑥: one GigE (ODU0) end-to-end service from a node 14 to a node 21, wherein, the ODU0 service is marked as GigE 3;

⑦: one ODUflex end-to-end service from a node 16 to a node 23, wherein, the required bandwidth is 10*1.25G, and the ODUflex service is marked as ODUflex2;

⑧: one GigE (ODU0) end-to-end service from the node 15 to the node 10, wherein, the ODU0 service is marked as GigE 4;

⑨: one STM-16 (ODU1) end-to-end service from the node 15 to the node 3, wherein, the service is marked as STM-16 2.

The specific steps for implementing the routing computation with respect to the request ⑥ are described as follows.

In step (61), the path computation entities of the management plane and the control plane use the related art to compute one available end-to-end routing for the end-to-end service establishment request ⑥ for the end-to-end service, e.g. the passed nodes are 14, 15, Gateway 5, 17, 19, 20, Gateway 7 and 21.

In step (62), since the Gateway 7 and Gateway 5 both support the multi-stage multiplexing capabilities of the ODU0-ODU2-ODU4 and ODU0-ODU3-ODU4, the path computation entities can select an identical two-stage multiplexing and demultiplexing capability according to a certain policy. For example, if network operation staff consider that some ODUflex applications also exist in subsequence and the bandwidth demand is greater than 8*1.25G (that is to say, the bandwidth demand is greater than the ODU2), the operation staff can appoint that the multi-stage multiplexing method of the ODU0-ODU3-ODU4 is used between the Gateway 5 and Gateway 7 in the end-to-end ODUk service request. Thus it enables an ODU3 tunnel created between the Gateway 5 and Gateway 7 for the end-to-end ODU0 service to be fully shared by the subsequent ODUflex services. Therefore, the path computation entity uses the multi-stage multiplexing method of the ODU0-ODU3-ODU4 between the Gateway 5 and Gateway 7 for the request ⑥. The path computation entity also can make the selection by itself, for example, if the path computation entity selects the multi-stage multiplexing capability of ODU0-ODU2-ODU4, it is required to establish an ODU2 tunnel between the Gateway 7 and Gateway 5, but apparently, this ODU2 tunnel can not be shared by the subsequent ODUflex services (of which the bandwidth demand is greater than 8*1.25G).

The specific steps for implementing the routing computation with respect to the request 0 are described as follows.

In step (71), since the ODUflex end-to-end service needs to go through the Gateway 5 and Gateway 7, and the system has established one ODU3 tunnel between the Gateway 5 and Gateway 7 for the request ⑥, and the ODU3 tunnel still has 31*1.25G bandwidth residue, the path computation entities of the management plane and the control plane use the related art to compute one available end-to-end routing for the end-to-end ODUflex service establishment request ⑦, e.g. the passed nodes are 16, Gateway 5, 17, 19, 20, Gateway 7, 22 and 23.

In step (72), since it is determined to select to go through one shared ODU3 tunnel in the step (71), the path computation entities select the multi-stage multiplexing method of ODUflex-ODU3-ODU4 with respect to the GigE service on the Gateway 5 and Gateway 7 for the service request. Therefore, the ODUflex service in the request ⑦ and the ODU0 service in the request ⑥ share a section of the ODU3 tunnel, but it is required to configure different multi-stage multiplexing capabilities (methods) at the same port on the same gateway network element node for these two services.

The specific steps for implementing the routing computation with respect to the request ⑧ are described as follows.

In step (81), the path computation entities of the management plane and the control plane use the related art to determine that the gateway network elements Gateway 5, Gateway 2 and Gateway 3 are required to be passed for the end-to-end service establishment request ⑧.

In step (82), since the ODU3 Network 2 can only perform switching between the ODU1 and ODU2 and does not support the 1.25G time slot, the ODU0 can only be firstly mapped to the ODU1 or ODU2 through the gateway network element Gateway 2 and then mapped to the ODU3. Meanwhile, the path computation entities acquire that the gateway network element Gateway 3 can perform the multi-stage multiplexing of ODU0-ODU2-ODU4, and the Gateway 5 supports the multi-stage multiplexing of ODU0-ODU2-ODU4 and ODU0-ODU3-ODU4, thus two solutions exist.

In method 1, one ODU2 tunnel is established between the Gateway 3 and Gateway 5, and thus, the path computation entities select the mapping and multiplexing capability of the ODU0-ODU2-ODU4 for the service request on the gateway network element Gateway 5, select the mapping and multiplexing capability of the ODU0-ODU2-ODU3 for the service request on the gateway network element Gateway 3, and select the mapping and multiplexing capability of the ODU4-ODU2-ODU3 for the service request on the gateway network element Gateway 2.

In method 2, one ODU3 tunnel is established between the Gateway 3 and Gateway 5, and thus, the path computation entities select the mapping and multiplexing capability of the ODU0-ODU3-ODU4 for the service request on the gateway network element Gateway 5, select the mapping and multiplexing capability of the ODU0-ODU3 for the service request on the gateway network element Gateway 3, and select the mapping and multiplexing capability of the ODU4-ODU3 for the service request on the gateway network element Gateway 2.

Seen from the complexity of service scheduling, when one ODU3 tunnel is established to transmit the services, less multi-stage multiplexing times and multi-stage multiplexing layers are needed, thus the path computation entities select to establish one ODU3 tunnel, which goes through the gateway network element Gateway 2, between the Gateway 5 and Gateway 1. Therefore, when the path computation entities select the multi-stage multiplexing capabilities on the passed gateway network elements, a minimization principle of multi-stage multiplexing layers and multi-stage multiplexing times is followed.

The specific steps for implementing the routing computation with respect to the request ⑨ are described as follows.

In step (91), the path computation entities of the management plane and the control plane use the related art to determine that the gateway network elements Gateway 5, Gateway 2 and Gateway 1 are required to be passed for the end-to-end service establishment request ⑨.

In step (92), since nodes 17, 18, 19 and 20 in the ODU4 Network 6 can not support ODU1 switching, an ODU1 connection can not be directly established between the node 15 and the node 3. However, one ODU2 tunnel or ODU3 tunnel can be directly established between the Gateway 5 and Gateway 1, and the ODU1 is multiplexed to the ODU2 or ODU3 on the Gateway 5 and Gateway 1.

If one ODU2 tunnel needs to be established between the Gateway 5 and Gateway 1, it is required to select the following multiplexing methods on the gateway network elements Gateway 5, Gateway 2 and Gateway 1 respectively:
Gateway 5: ODU1-ODU2-ODU4
Gateway 2: ODU4-ODU2-ODU3
Gateway 1: ODU1-ODU2-ODU3

If one ODU3 tunnel needs to be established between the Gateway 5 and Gateway 1, it is required to select the following multiplexing methods on the gateway network elements Gateway 5, Gateway 2 and Gateway 1 respectively:
Gateway 5: ODU1-ODU3-ODU4
Gateway 2: ODU4-ODU3
Gateway 1: ODU3-ODU1

Seen from the complexity of service scheduling, when one ODU3 tunnel is established to transmit the services, less multi-stage multiplexing times and multi-stage multiplexing layers are needed, and when the path computation entities select the multi-stage multiplexing capabilities on the passed gateway network elements, the minimization principle of multi-stage multiplexing layers and multi-stage multiplexing times is followed. Therefore, the path computation entities select to establish one ODU3 tunnel, which goes through the gateway network element Gateway 2, between the Gateway 5 and Gateway 1.

Example 4

In the example, the step S4 in the method for establishing the end-to-end service will be further described.

The steps of the management plane configuring the end-to-end service are shown as follows, and the service ① is specifically described in the following example, but the implementation steps thereof also can be used for the services ②, ③, ④, ⑤, ⑥, ⑦, ⑧, and ⑨.

In step (401), the management plane uses the related art to configure one ODU2 tunnel between the gateway network elements Gateway 1 and Gateway 3.

In step (402), the management plane uses the related art to configure one ODU0 service between the node 1 and Gateway 1 (going through the node 3) and configure one ODU0 service between the Gateway 3 and node 10 (going through the node 9).

In step (403), the management plane needs to configure the multi-stage multiplexing way, which is ODU0-ODU2-ODU3, on the Gateway 1 and Gateway 3 respectively for the end-to-end ODU0 service, concatenates the two ODU0 services to one ODU2 tunnel, and configures related cross connections on the Gateway 1 and Gateway 3.

The steps of the control plane configuring the end-to-end service are shown as follows, and the service ① is specifically described in the implementation steps, and the implementation steps also can be used for the services ②, ③, ④, ⑤, ⑥, ⑦, ⑧, and ⑨.

In step (501), the control plane uses a routing result computed by the path computation entity to initiate a signaling process of establishing the end-to-end ODU0 connection, and includes the multi-stage multiplexing capability (method) information, which is ODU0-ODU2-ODU3, selected by the path computation entity on the gateway network elements Gateway 1 and Gateway 3 in a signaling (Path and Resv). Meanwhile, in the signaling, it is explicitly appointed that the related ODU2 tunnel is created between two gateway network elements, such as the Gateway 1 and Gateway 3 in the service ①.

In step (502), when a signaling message (Path) reaches the gateway network element Gateway 1, one ODU2 connection which has higher rates and can bear the end-to-end ODU0 connection is triggered to be established between the gateway network elements Gateway 1 and Gateway 3.

In step (503), after the tunnel establishment of the ODU2 is finished, the establishment process of the ODU0 connection is recovered.

In step (504), After a Path message or a Resv message of establishing the ODU0 connection reaches the gateway network element, the multi-stage multiplexing capability (method) ODU0-ODU2-ODU3 included in the signaling (the Path message or the Resv message) is configured to a specific port in the corresponding gateway network element.

INDUSTRIAL APPLICABILITY

With the method and system for establishing the end-to-end service, the optical transport network and the signal transmission method thereof provided by the present invention, the gateway network elements are introduced or the existing certain network elements are upgraded to the gateway network elements, and the multi-stage multiplexing is implemented on these gateway network elements, which can better implement the end-to-end interconnection after new signal types are introduced in the automatically switched optical network of optical transport network, protect the existing OTN network, and reduce additional development costs of the operators.

What is claimed is:

1. A method for establishing an end-to-end service, comprising:
   a path computation entity acquiring link information in a network and multi-stage multiplexing capability constraint information supported by gateway network elements;
   when an end-to-end path computation request is received, according to the link information and the multi-stage multiplexing capability constraint information supported by the gateway network elements, the path computation entity performing an end-to-end routing computation to acquire an end-to-end routing, and selecting a multi-stage multiplexing capability used on a gateway network element passed by the end-to-end routing; and
   a path configuration entity configuring the end-to-end service, and configuring the selected multi-stage multiplexing capability to the gateway network element passed by the end-to-end routing.

2. The method according to claim 1, wherein, in the step of selecting the multi-stage multiplexing capability used on the gateway network element passed by the end-to-end routing, a minimization principle of multi-stage multiplexing layers and/or multi-stage multiplexing times is followed to select the multi-stage multiplexing capability used on the gateway network element passed by the end-to-end routing.

3. The method according to claim 2, wherein, in the step of, when an end-to-end path computation request is received, according to the link information and the multi-stage multiplexing capability constraint information supported by the gateway network elements, performing an end-to-end routing computation,
   when the multi-stage multiplexing capability which is used or can not be used on the gateway network element passed by the end-to-end routing is carried in the end-to-end path computation request, the multi-stage multiplexing capability which is used or can not be used on the gateway network element passed by the end-to-end routing carried in the end-to-end path computation request is used for the end-to-end routing computation.

4. The method according to claim 2, wherein, the step of acquiring multi-stage multiplexing capability constraint information supported by gateway network elements comprises:
   acquiring the multi-stage multiplexing capability constraint information supported by the gateway network elements through an auto-discovery protocol or a routing protocol.

5. The method according to claim 2, wherein, the step of configuring the end-to-end service, and configuring the selected multi-stage multiplexing capability on the gateway network element passed by the end-to-end routing comprises:
   a control plane initiating an end-to-end connection establishment process through a signaling, and including the multi-stage multiplexing capability selected on the gateway network element passed by the end-to-end routing;
   when the signaling reaches the gateway network element, configuring the selected multi-stage multiplexing capability on the gateway network element.

6. The method according to claim 5, wherein, gateway network elements for which a tunnel is required to be created is further appointed in the signaling; and the method further comprises:

when the signaling reaches a gateway network element, if a tunnel between the gateway network element and another gateway network element for which the tunnel is required to be created is not established, establishing the tunnel.

7. The method according to claim 1, wherein, in the step of, when an end-to-end path computation request is received, according to the link information and the multi-stage multiplexing capability constraint information supported by the gateway network elements, performing an end-to-end routing computation, when the multi-stage multiplexing capability which is used or can not be used on the gateway network element passed by the end-to-end routing is carried in the end-to-end path computation request, the multi-stage multiplexing capability which is used or can not be used on the gateway network element passed by the end-to-end routing carried in the end-to-end path computation request is used for the end-to-end routing computation.

8. The method according to claim 1, wherein, the step of acquiring multi-stage multiplexing capability constraint information supported by gateway network elements comprises:

acquiring the multi-stage multiplexing capability constraint information supported by the gateway network elements through an auto-discovery protocol or a routing protocol.

9. The method according to claim 1, wherein, the step of configuring the end-to-end service, and configuring the selected multi-stage multiplexing capability on the gateway network element passed by the end-to-end routing comprises:

a control plane initiating an end-to-end connection establishment process through a signaling, and including the multi-stage multiplexing capability selected on the gateway network element passed by the end-to-end routing;

when the signaling reaches the gateway network element, configuring the selected multi-stage multiplexing capability on the gateway network element.

10. The method according to claim 9, wherein, gateway network elements for which a tunnel is required to be created is further appointed in the signaling; and the method further comprises:

when the signaling reaches a gateway network element, if a tunnel between the gateway network element and another gateway network element for which the tunnel is required to be created is not established, establishing the tunnel.

* * * * *